United States Patent [19]

Tanaka et al.

[11] Patent Number: 4,488,276

[45] Date of Patent: Dec. 11, 1984

[54] INFORMATION READ APPARATUS WITH TRACKING CONTROL SYSTEM

[75] Inventors: Shinichi Tanaka, Kyoto; Namio Hirose, Hirakata, both of Japan

[73] Assignee: Matsushita Electric Industrial Co., Ltd., Kadoma, Japan

[21] Appl. No.: 339,509

[22] Filed: Jan. 15, 1982

[30] Foreign Application Priority Data

Jan. 16, 1981 [JP] Japan .................................... 56-5271

[51] Int. Cl.[3] ......................... H04N 5/76; G11B 7/00; G11B 21/00

[52] U.S. Cl. ....................................................... 369/46

[58] Field of Search ............................. 369/46, 43, 44; 358/342; 360/77

[56] References Cited

U.S. PATENT DOCUMENTS

| | | | |
|---|---|---|---|
| 3,932,700 | 1/1976 | Shopko | 369/46 X |
| 4,118,735 | 10/1978 | Wilkinson | 369/44 |
| 4,310,911 | 1/1982 | Fujishima | 369/44 X |
| 4,338,682 | 7/1982 | Hosaka et al. | 369/46 X |

*Primary Examiner*—Robert L. Richardson

*Attorney, Agent, or Firm*—Wenderoth, Lind & Ponack

[57] ABSTRACT

An information read apparatus with tracking control system comprises a first closed loop and a second closed loop. The first closed loop performs high speed tracking control and feedback compensation for damping the tracking control system, with the aid of a means for detecting the tracking error without excess frequency dependency. The second closed loop performs precise tracking control with the aid of tracking error detection by wobbling the reading position on the information carrier in a direction traverse to the information track being read. The second closed loop is dominant only in the low frequency region. Since the second closed loop is negligible in comparison with the first closed loop near the cross-over frequency of the tracking control system, phase lag of the second closed loop is allowable about said cross-over frequency. Therefore, the wobbling frequency can be selected so low that the same actuator that controls the global reading position can be used for wobbling. In this way, the tracking control system performs both of high precision control and high speed control.

5 Claims, 14 Drawing Figures

INFORMATION READ APPARATUS WITH TRACKING CONTROL SYSTEM

BACKGROUND OF THE INVENTION

This invention relates to an information read apparatus for reading information tracks in an information plane of an information carrier, with the aid of a tracking control system, and more particularly with the aid of a tracking control system comprising a first closed loop for high speed control, and a second closed loop for high precision control.

Tracking control systems which usually consist of single closed loops need a means for detecting tracking error. A differential method and a wobbling method are both well known means for detecting tracking error.

Said differential method is typical. In this method, a tracking error is detected differentially by plural detectors. This is discussed in detail in U.S. Pat. No. 3,909,608. This method is very simple and easy, but has a defect in that the detected tracking error signal inherently tends to include low frequency (or DC) noises, due to the fact that said detectors detect a variation of some physical value caused by a tracking error instead of detecting the tracking error directly. Generally speaking, said detected value does not always precisely coincide with the tracking error. For example, in an optical information readout system, a reflected light beam from an information carrier forms a far-field-pattern around the boundary of plural photodetectors neighboring each other, and the boundary is effectively parallel to an information track. When a readout light spot deviates from the center of an information track, the power distribution of the far-field pattern becomes unbalanced about the boundary. Then, a tracking error can be detected as the differential signal from the plural detectors. The power distribution of the far-field pattern, however, becomes unbalanced not only when there is a tracking error but also when the information carrier is warped. Therefore, in this method, a false tracking error tends to be detected. Moreover, in many cases, the tracking error signal is so small that the tracking control is disturbed by a DC-offset of the head amplifier which is operatively coupled to said detectors.

On the other hand, said wobbling method does not have the defect mentioned above. In this wobbling method, a tracking error is detected as follows. The reading position on the information track being read moves periodically at a properly selected frequency about a global position with a low amplitude (wobble) in a direction traverse to said information track. When there is no tracking error about the global reading position, the amplitude of the read out signal varies periodically at double the wobbling frequency. But when a tracking error occurs, the variation of the amplitude of the read out signal includes the same frequency component as the wobbling frequency. The phase of said same frequency component is reversible relative to the phase of wobbling according to the direction of the tracking error. Accordingly, a tracking error can be detected from the amplitude signal by synchronous detection with reference to the wobbling signal, where said amplitude signal is the signal which is proportional to the amplitude of said read out signal from the read head. Further details of the wobbling method are described in U.S. Pat. No. 4,151,570.

In the above wobbling method, a tracking error is directly detected through amplitude reduction of the read out signal. Therefore, the detected tracking error signal precisely coincides with the real tracking error. Besides, tracking error signals obtained through synchronous detection are not disturbed much by DC-offsets of the pre-amplifier, because said amplitude signals which are to be synchronously detected have been sufficiently amplified after passing through the band-pass filter whose center frequency is equal to the wobbling frequency.

The wobbling method, however, has a defect in that the reading position must be wobbled at a frequency which is substantially higher than the cross-over frequency of the tracking control system. If the cross-over frequency is required to be as high as 1 KHz, the wobbling frequency is required to be higher than about 10 KHz. Therefore, in this case, a special actuator is usually necessary for wobbling. When the reading position is wobbled at a relatively low frequency by the same actuator that controls the global reading position, the tracking control system can not follow high speed deviation because the cross-over frequency of the tracking control system can not be set so high.

SUMMARY OF THE INVENTION

It is an object of the present invention to provide an information read apparatus employing a tracking control system in which the above mentioned defects inherent in prior arts are avoided.

In the present invention, the tracking control system employs a differential method for the first closed loop. The cross-over frequency of the open loop gain of said first closed loop is set high enough to accomplish the required high speed control. Furthermore, the tracking control system employs a wobbling method for the second closed loop. The cross-over frequency of the open loop gain of said second closed loop is set low enough to lower the wobbling frequency in order that the reading position can be wobbled by the same actuator that controls the global reading position. The second closed loop includes a low pass filter and/or the first closed loop includes a high pass filter so that the second closed loop is dominant only in the low frequency region. Said second closed loop can be used for parallel compensation in order to cancel the low frequency (or DC) tracking error remaining after control by the first closed loop, because the open loop gain of the second closed loop is greater than that of the first closed loop in the low frequency region. Since the effect of the second closed loop is negligible in comparison with the first closed loop about the cross-over frequency of the tracking control system, the phase lag of the second closed loop is acceptable about said cross-over frequency. Therefore, the wobbling frequency can be selected to be low enough that the same actuator that controls the global reading position can be used for wobbling. In this way, the tracking control system performs both high precision control and high speed control.

BRIEF DESCRIPTION OF THE DRAWINGS

The present invention will now be described in detail with reference to the accompanying drawings in which.

DESCRIPTION OF THE PREFERRED EMBODIMENTS

Figure 1:
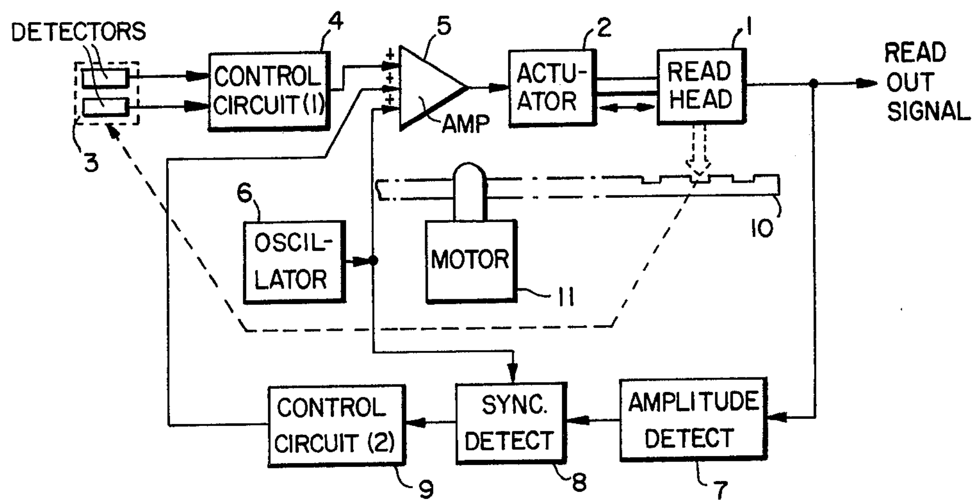
FIG. 1 shows a schematic block diagram of an apparatus embodying the present invention.

FIG. 1 shows a tracking control system comprising two closed loops, that is, the first closed loop and the second closed loop. The first closed loop consists of a read head 1, plural detectors 3, the first control circuit 4, a driving amplifier 5, and an actuator 2. The second closed loop consists of said read head 1, amplitude detecting means 7, synchronous detecting means 8, the second control circuit 9, said driving amplifier 5, and said actuator 2. Said read head 1 reads information from an information carrier 10 which is rotated by a motor 11. Said actuator 2, which is operatively coupled to said read head 1, moves the read head 1 or a part of it. Accordingly, the reading position where information is read with said read head 1 is moved by said actuator 2. Under the condition that there is a tracking error, that is, a deviation of the reading position from the regular position relative to the information track being read, output signals from plural detectors 3 become unbalanced. The differential output from said plural detectors 3 is amplified and processed by the first control circuit 4 which includes a differential amplifier and a phase lead compensator. The output signal from said first control amplifier 4 is amplified by the driving amplifier 5 to drive the actuator 2. In this way the first closed loop is formed. The open loop transfer function $G_1(s)$ is generally described as follows:

$$G_1(s)=\{\omega_N^2(s/\omega_P+1)\}/(s^2+2\xi\omega_o s+\omega_o^2) \quad (1a)$$

or $$G_1(s)=\{\omega_N^2(s/\omega_P+1)\}/s^2 \quad (1b)$$

where $\omega_o$ is the resonant angular frequency of the actuator, $\xi$ is the damping coefficient of said resonance, $\omega_P$ is the corner angular frequency of the phase lead compensator, and $\omega_N$ is nearly equal to the natural angular frequency of the first closed loop.

Figure 2A:
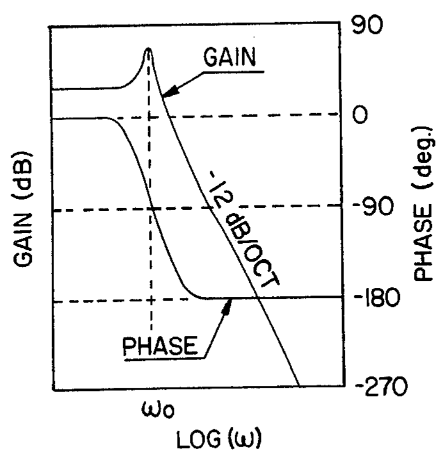
FIGS. 2(A) and 2(B) show transfer characteristics of two different types of actuators.
Figure 2B:
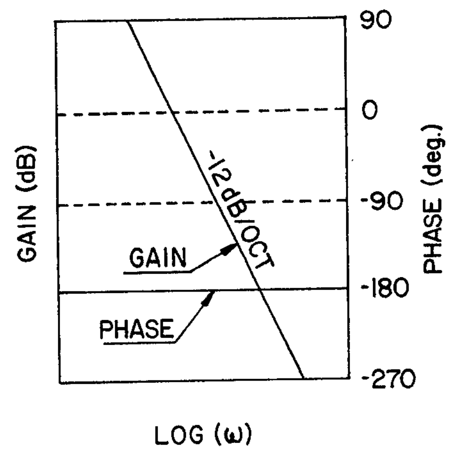
Figure 3A:
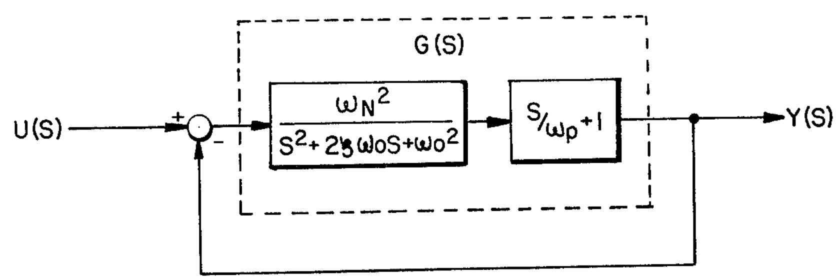
FIGS. 3(A) and 3(B) show an abstract block diagram of the first closed loop.
Figure 3B:
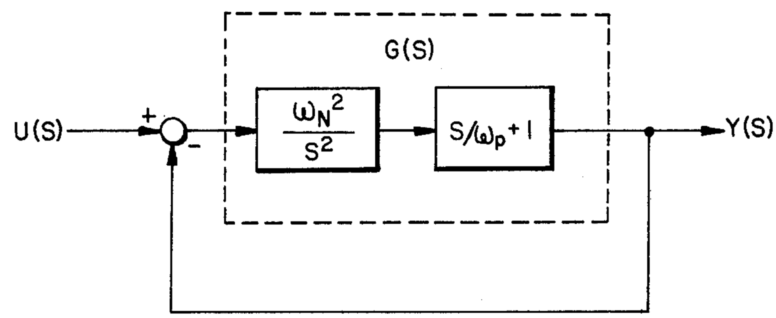

Equation (Eq., hereafter) (1a) is the open loop transfer function when a damper suspends the moving element which is moved by said actuator, and Eq. (1b) is the open loop transfer function when said damper is not used. The typical characteristic of said actuator with a damper is shown in FIG. 2(A), and the typical characteristic of said actuator without a damper is shown in FIG. 2(B). Both types of actuators are useful for the tracking control system. FIGS. 3(A) and 3(B) show abstract block diagrams of the first closed loop corresponding to Eq. (1a) and Eq. (1b), respectively. In these block diagrams, U(s) is a reference input (displacement of the information track) and Y(s) is a controlled variable (movement of the reading position on the information track). In this case, the steady-state position error $e_s$ to the reference input of step function u is $$e_s=u/\{1+G(o)\}\approx U/G(o) \quad (2)$$

Figure 4:
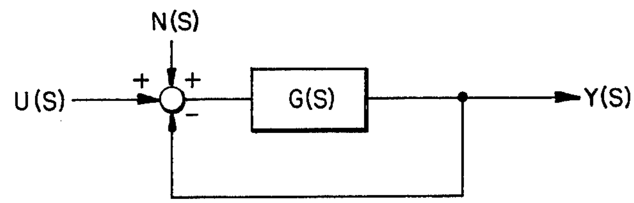
FIG. 4 shows an abstract block diagram of the first closed loop with noise.

Usually, the tracking control system is designed so that the steady-state position error $e_s$ is reduced so as to be less than a permissible value. However, the ideal tracking control system mentioned above is difficult to accomplish with the aid of plural detectors used to detect tracking errors differentially, because of the fact that the tracking error is detected indirectly. Therefore, the block diagram of the first closed loop is described as shown in FIG. 4. N(s) is a noise input caused by temperature drift, maladjustment of the detectors, or a variation of some condition of the information carrier. In this case, the tracking error E(s) is described as follows:

$$\begin{aligned} E(s) &= U(s) - Y(s) \quad (3) \\ &= U(s)/\{1 + G(s)\} - \{G(s) \cdot N(s)\}/\{1 + G(s)\} \\ &\approx U(s)/G(s) - N(s) \end{aligned}$$

Eq. (3) means that the controlled variable Y(s) includes the tracking error of N(s) in addition to the steady-state position error $e_s$. This tracking error N(s) is inherent to differential tracking error detection.

Figure 5:
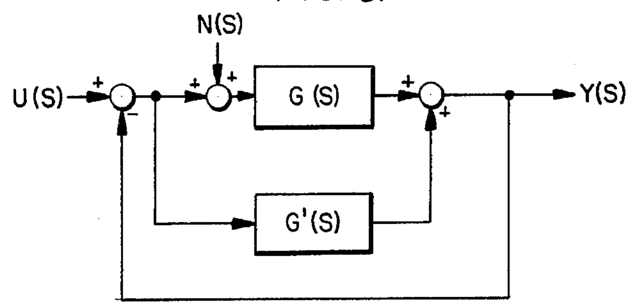
FIG. 5 shows an abstract block diagram of the first closed loop with noise and the second closed loop for parallel compensation.

This tracking error E(s) is effectively suppressed by parallel compensation in accordance with the present invention. FIG. 5 is an abstract block diagram used to explain the principle of the present invention. In this case, the tracking error E(s) becomes as follows:

$$\begin{aligned} E(s) &= \{U(s) - G(s) \cdot N(s)\}/\{G(s) + G'(s) + 1\} \quad (4) \\ &\approx \{U(s)/G(s) - N(s)\}/G'(s)/G(s) + 1\} \end{aligned}$$

Generally speaking, since the noise N(s) produced by the differential error detecting process consists of only low frequency components, the open loop transfer function G'(s) of the second closed loop is required to be only large enough in the low frequency region to suppress the noise N(s). Besides, the second closed loop for parallel compensation must employ means for detecting tracking errors without significant noise.

The inventors have discovered that the wobbling method is suitable for the tracking error detection mentioned above. The second closed loop (employing the wobbling method) is embodied in FIG. 1. The second closed loop functions are as follows. The oscillator 6 is oscillating at a properly selected frequency. The output signal from the oscillator 6 is fed into the first closed loop. In this example, the oscillator 6 feeds the outputs signal to the driving amplifier 5. Then the reading position is wobbled. The amplitude of the read out signal is varied by the wobbling. The amplitude detecting means 7 detects the amplitude of the read out signal to produce a signal which is proportional to said amplituide of the read out signal. Envelope demodulation or rectification can be applied to said amplitude detecting means 7. The synchronous detecting means 8 produces the tracking error signal from the output signal of the amplitude detecting means 7. For example, a multiplying circuit can be applied to the synchronous detecting means 8.

The second control circuit 9 amplifies and processes the tracking error signal detected by the wobbling method mentioned above. Then, the output signal from said second control circuit 9 is fed to the driving amplifier 5 to control reading position. In this way, the second closed loop performs. Furthermore, the second control circuit 9 includes a low pass filter and/or the first control circuit 4 includes a high pass filter so that the effect of the second closed loop is dominant only in the low frequency region.

Figure 6:
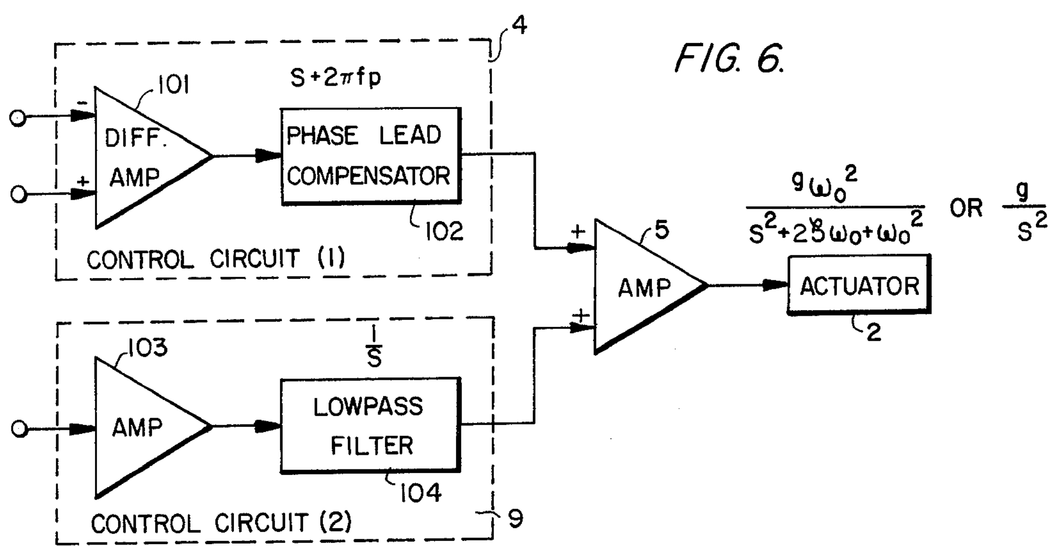
FIG. 6 shows a block diagram of an embodiment of the first and the second control circuit of FIG. 1.

FIG. 6 shows a block diagram of an example of the first and the second control circuits. The first control circuit consists of a differential amplifier 101 and a phase lead compensator 102. The second control circuit consists of an amplifier 103 and an Nth order (N=1, 2, 3 . . . ) low pass filter 104. The open loop transfer function G(s) of the first closed loop and the open loop transfer function G'(s) of the second closed loop are respectively described as follows:

$$G(s)=g_a(S+\omega p)/(S^2+2\xi\omega_o+\omega_o^2) \quad (5a)$$

or $$G(s)=g_b(S+\omega p)/S^2 \quad (5b)$$

and $$G'(s)=g_a'/\{S(S^2+2\xi\omega_o+\omega_o^2)\} \quad (6a)$$

or $$G'(s)=g_b'/S^3 \quad (6b)$$

Figure 7A:
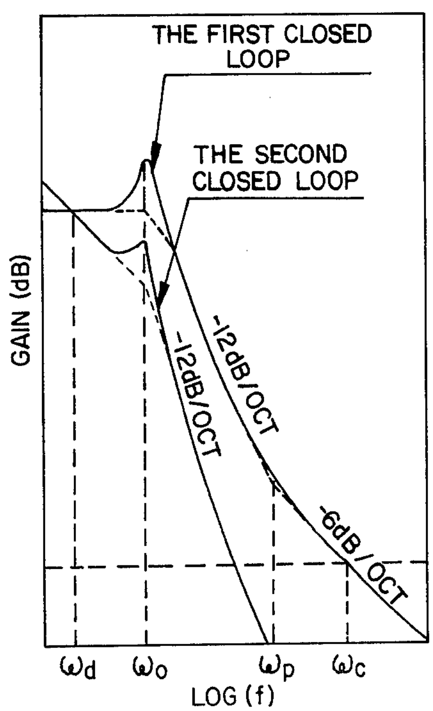
FIGS. 7(A) and 7(B) show open loop gain characteristics of the embodiment in FIG. 3.
Figure 7B:
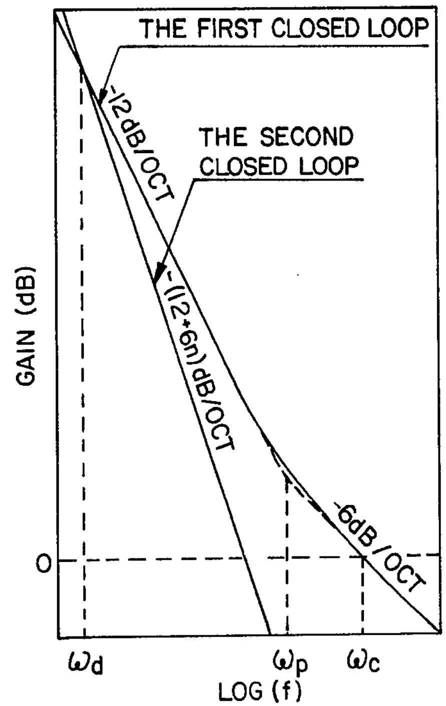

Eqs. (5a) and (6a) and Eqs. (6a) and (6b) correspondto the characteristics of the actuator shown in FIGS. 2(A) and 2(B), respectively. Open loop gains are shown in FIGS. 7(A) and 7(B) corresponding to Eqs. (5a) and (6a) and Eqs. (5b) and (6b), respectively. In FIG. 7, $\omega_d$ is the cross-over angular frequency between the open loop gain of the first closed loop and the open loop gain of the second closed loop. In the low frequency region, which is lower than $W_d$, the second closed loop is dominant and in the high frequency region, which is higher than $W_d$, the first closed loop is dominant. The angular frequency $\omega_c$ is the cross-over frequency of the tracking control system.

Figure 8:
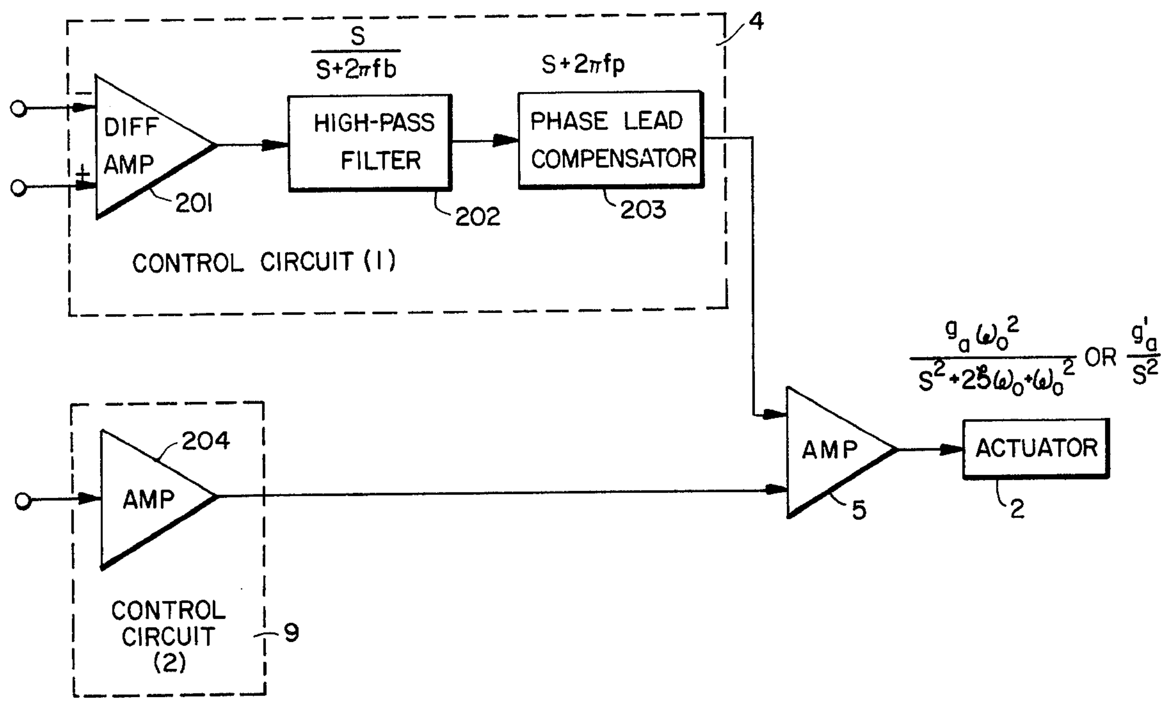
FIG. 8 shows a block diagram of another embodiment of the first and the second control circuit of FIG. 1.

FIG. 8 shows a block diagram of another example of the first and the second control circuit. The first control circuit consists of a differential amplifier 201, a high pass filter 202, and a phase lead compensator 203. The second control circuit consists of an amplifier 204. The open loop transfer function G(s) of the first closed loop and the open loop transfer function G'(s) of the second closed loop are respectively described as follows:

$$G(s)=g_aS(S+\omega p)/(S+\omega_b)(S^2+2\xi\omega_oS+\omega_o^2) \quad (7a)$$

or $$G(s)=g_bs(s+\omega p)/s^2(s+\omega_b) \quad (7b)$$

and $$G'(s)=g_a'/(s^2+2\xi\omega_os+\omega_o^2) \quad (8a)$$

or $$G'(s)=g_b'/s^2 \quad (8b)$$

Figure 9A:
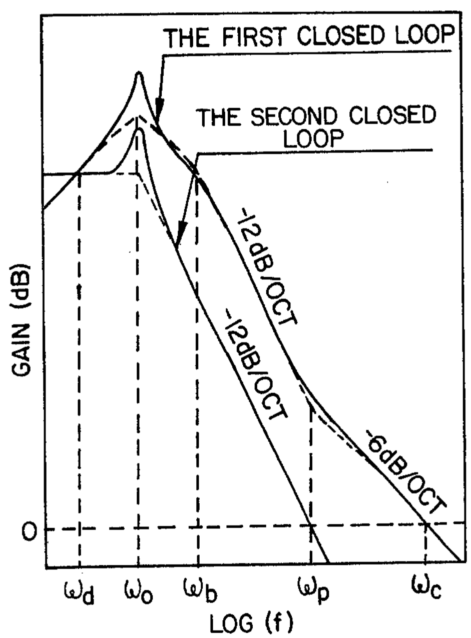
FIGS. 9(A) and 9(B) show open loop gain characteristics of the embodiment in FIG. 5.
Figure 9B:
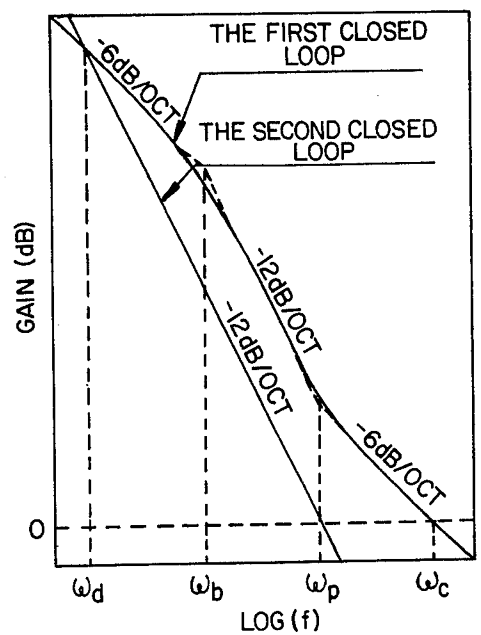

Open loop gains are shown in FIGS. 9(A) and 9(B) corresponding to Eqs. (7a), (7b), (8a) and (8b) as well as FIGS. 7(A) and 7(B). Values marked in FIGS. 7(A), 7(B), 9(A) and 9(B) show slopes of the asymptotes.

In this way (as mentioned above) the tracking control system can accomplish a high speed and high precision control without using a special actuator. Moreover, in the case that the first control circuit includes a high pass filter (shown in FIG. 6) and the second control circuit includes a low pass filter (shown in FIG. 8), this invention is obviously effective.

Figure 10:
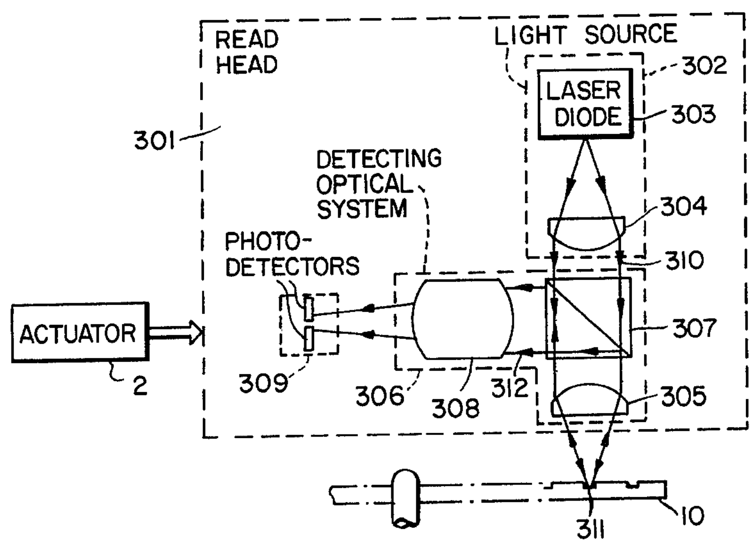
FIG. 10 shows an embodiment of the read head of FIG. 1 applying optical reading.

This technique can be useful for every kind of information reading apparatus, for example, an optical reading apparatus, a magnetic reading apparatus, or a capacitance sensitive information reading apparatus. The present invention is particularly effective for an optical information read apparatus, because a tracking error signal detected differentially by plural photo-detectors tends to include much low frequency noise. An example of embodiment of an optical read head is shown in FIG. 10. An optical read head 301 comprises a light source 302, a focussing lens 305, a detecting optical system 306, and plural photo-detectors 309. Said light source 302 radiates a light beam 310. For example, said light source 302 consists of a laser diode 303 and a collimating lens 304. A focussing lens focuses said light beam 310 to form a read spot 311 on the information carrier 10. Said light beam 310 is reflected by the information carrier 10 and collected by said focussing lens 305 to be formed into a reflected light beam 312. Said reflected light beam 312 is separated from the light beam 310 by a beam splitter 307 and processed by a processing optical block 308. A detecting optical system consists of said focussing lens 305, said beam splitter 307, and said processing optical block 308. Then, said reflected light beam 312 is converted to a electrical signal by plural photo-detectors 309. The sum of the output signals from said photo-detectors 309 is the information signal and the difference of said output signals is the tracking error signal. Said processing optical block 308, for example, consists of a positive lens for tracking error detection in the direction across the information track in the information plane, or consists of a positive lens and asymmetric element for tracking error detection in the direction normal to the information plane. In this optical read head, the tracking error signal detected by the photo-detectors 309 tend to includes false signals, because of a temperature drift, a variation in the intensity of the reflected light beam 312, or a warping of the information carrier. Then, the optical read head 307 is wobbled by an actuator 2 to detect the accurate tracking error. Said actuator 2 moves the optical read head to control the global position of the read spot 311 in addition to the wobbling. The actuator for wobbling and tracking control may move the focussing lens 305 or other parts in the optical read head 301. FIG. 10 shows the optical read head for a reflective information carrier, but the fundamental constitution of the optical read head for a transparent information carrier is almost the same as the optical read head mentioned above.

In a magnetic information readout system, the above mentioned plural detectors can be made up with two magnetic heads which are connected to each other and trace an information track together. In this case, tracking error can be similarly detected out of the difference of two output signals from the magnetic heads. The sum of these two output signals is then read out as the information signal.

Although we have shown and described several forms of our invention, it is to be clearly understood that various change, modifications and other alterations may be made without departing from the invention.

What is claimed is:

1. An information read apparatus comprising: a read head including plural detectors for reading information from an information carrier and for detecting an error of a reading position where information is read on the information carrier; an actuator operatively coupled to said read head for moving said read head or a part of said read head in order to control said reading position; a first control circuit operatively coupled to said plural detectors for amplifying and processing a differential signal from said plural detectors; a driving amplifier operatively coupled to said first control circuit for driving said actuator; an oscillator for generating a wobbling signal which finally wobbles said reading position at a properly selected frequency; an amplitude detecting means operatively coupled to said read head for producing an amplitude signal which is proportional to an amplitude of an output signal from said read head; a synchronous detecting means operatively coupled to said amplitude detecting means for synchronously detecting said amplitude signal with reference to an output signal from said oscillator in order to produce a tracking error signal; a second control circuit operatively coupled to said synchronous detecting means for feeding an output signal to said driving amplifier after processing an input signal from said synchronous detecting means; and moving means operatively coupled to said information carrier for moving said information carrier, wherein said read head, said plural detectors, said first control circuit, said driving amplifier, and said actuator constitute a first closed loop, and wherein said read head, said amplitude detecting means, said synchronous detecting means, said second control circuit, said driving amplifier, and said actuator constitutes a second closed loop, said first closed loop having a cross-over frequency which is higher than that of said second closed loop, and wherein said first control circuit and/or said second control circuit includes a filter selected so that said second closed loop has an open loop gain which is higher than that of said first closed loop in the frequency region which is lower than $W_d$, said frequency $W_d$ being a frequency which is lower than the cross-over frequency of said second closed loop.

2. An information read apparatus according to claim 1, wherein said second control circuit includes a low pass filter.

3. An information read apparatus according to claim 1, wherein said first control circuit includes a high pass filter.

4. An information read apparatus according to claim 1, wherein said first control circuit includes a low pass filter.

5. An information read apparatus according to claim 1, wherein said read head comprises: a light source for radiating a light beam; a focussing lens operatively coupled to said light source for focussing said light beam to form a read spot on said information carrier; an optical detecting system operatively coupled to said information carrier for collecting and processing the light beam from said information carrier; and plural photo-detectors operatively coupled to said detecting optical system for detecting an information and for differentially detecting a tracking error by converting said light beam from said information carrier into an electrical signal.

* * * * *